(12) United States Patent
Ikeda et al.

(10) Patent No.: US 8,140,722 B2
(45) Date of Patent: Mar. 20, 2012

(54) MOBILE TERMINAL, CHARACTER CONVERSION APPARATUS, CHARACTER CONVERSION PROCESS, COMPUTER PROGRAM, AND COMPUTER USABLE MEDIUM

(75) Inventors: Hitoshi Ikeda, Kawasaki (JP); Masao Iseki, Kawasaki (JP); Manabu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 12/855,204

(22) Filed: Aug. 12, 2010

(65) Prior Publication Data

US 2011/0040908 A1 Feb. 17, 2011

(30) Foreign Application Priority Data

Aug. 14, 2009 (JP) ................................ 2009-188078

(51) Int. Cl.
*G06F 13/12* (2006.01)
*G06F 3/00* (2006.01)

(52) U.S. Cl. ............................ 710/67; 715/811; 455/565

(58) Field of Classification Search .............. 710/65–67; 715/809–813, 840–841; 455/565–566; 341/22; 701/10
See application file for complete search history.

(56) References Cited

U.S. PATENT DOCUMENTS

| | | | | |
|---|---|---|---|---|
| 5,812,171 A * | 9/1998 | Kim | ............................... | 345/168 |
| 6,356,258 B1 * | 3/2002 | Kato et al. | ................... | 345/168 |
| 7,681,145 B1 * | 3/2010 | Pu | ................................. | 715/812 |
| 2005/0068323 A1 * | 3/2005 | Kim | ............................. | 345/467 |
| 2005/0104869 A1 * | 5/2005 | Chung | ......................... | 345/179 |
| 2006/0294273 A1 * | 12/2006 | Lee | ................................. | 710/67 |
| 2008/0204282 A1 * | 8/2008 | Jeon | ................................ | 341/22 |
| 2008/0300853 A1 * | 12/2008 | Xiaoning | ........................ | 704/2 |
| 2009/0113299 A1 * | 4/2009 | Chung | ......................... | 715/702 |
| 2010/0110015 A1 * | 5/2010 | Ahn et al. | .................... | 345/171 |
| 2010/0153880 A1 * | 6/2010 | Dinn | ............................. | 715/816 |
| 2011/0131488 A1 * | 6/2011 | Kang | ............................ | 715/261 |

FOREIGN PATENT DOCUMENTS

JP 2007-293924 A 11/2007

* cited by examiner

*Primary Examiner* — Christopher B Shin
(74) *Attorney, Agent, or Firm* — Fujitsu Patent Center

(57) ABSTRACT

A character conversion apparatus makes a predictive search of a conversion database for conversion candidates on the basis of one or more characters inputted by use of a character input key. The apparatus obtains, in reference to a table, the total number of times the character input key is to be pressed down before inputting an unconverted character included in each of the searched conversion candidates and immediately following the one or more characters. The table contains characters assigned to the total numbers of times the character input key is pressed down. The apparatus determines the order of display, on a screen of a display device, of the conversion candidates to align with a descending order of the total number of times the character input key is to be pressed down before inputting the unconverted character. On the screen, the conversion candidates are displayed in the determined order of display. The apparatus receives confirmation of one of the conversion candidates.

14 Claims, 12 Drawing Sheets

| Alphabetical Character | Total Number of Character-input-key Press-down Operations |
|---|---|
| A | Once |
| B | Twice |
| C | Three Times |
| D | Once |
| E | Twice |
| F | Three Times |
| G | Once |
| H | Twice |
| I | Three Times |
| J | Once |
| K | Twice |
| L | Three Times |
| M | Once |
| N | Twice |
| O | Three Times |
| P | Once |
| Q | Twice |
| R | Three Times |
| S | Four Times |
| T | Once |
| U | Twice |
| V | Three Times |
| W | Once |
| X | Twice |
| Y | Three Times |
| Z | Four Times |

FIG.3

| Ordinal Number | Conversion Candidate | Next Character | Character Input Key for Next Character Input | Total Number of Character-input-key Press-down Operations |
|---|---|---|---|---|
| 1 | ABSTRACT | S | 7 | Four Times |
| 2 | ABSOLUTE | S | 7 | Four Times |
| 3 | ABSENT | S | 7 | Four Times |
| 4 | ABSENCE | S | 7 | Four Times |
| 5 | ABSORB | S | 7 | Four Times |
| 6 | ABOUT | O | 6 | Three Times |
| 7 | ABLE | L | 5 | Three Times |
| 8 | ABILITY | I | 4 | Three Times |
| 9 | ABOVE | O | 6 | Three Times |
| 10 | ABOUND | O | 6 | Three Times |
| 11 | ABIDE | I | 4 | Three Times |
| 12 | ABOARD | O | 6 | Three Times |
| 13 | ABROAD | R | 7 | Three Times |
| 14 | ABUNDANT | U | 8 | Twice |
| 15 | ABANDON | A | 2 | Once |

FIG.4

| Ordinal Number | Conversion Candidate | Next Character | Character Input Key for Next Character Input | Total Number of Character-input-key Press-down Operations |
|---|---|---|---|---|
| 1 | ABOUT | O | 6 | Three Times |
| 2 | ABLE | L | 5 | Three Times |
| 3 | ABUNDANT | U | 8 | Twice |
| 4 | ABANDON | A | 2 | Once |
| 5 | ABSTRACT | S | 7 | Four Times |
| 6 | ABSOLUTE | S | 7 | Four Times |
| 7 | ABSENT | S | 7 | Four Times |
| 8 | ABILITY | I | 4 | Three Times |
| 9 | ABSENCE | S | 7 | Four Times |
| 10 | ABOVE | O | 6 | Three Times |
| 11 | ABOUND | O | 6 | Three Times |
| 12 | ABSORB | S | 7 | Four Times |
| 13 | ABIDE | I | 4 | Three Times |
| 14 | ABOARD | O | 6 | Three Times |
| 15 | ABROAD | R | 7 | Three Times |

FIG.5

| Ordinal Number | Conversion Candidate | Next Character | Character Input Key for Next Character Input | Total Number of Character-input-key Press-down Operations |
|---|---|---|---|---|
| 1 | ABOUT | O | 6 | Three Times |
| 2 | ABLE | L | 5 | Three Times |
| 3 | ABSTRACT | S | 7 | Four Times |
| 4 | ABSOLUTE | S | 7 | Four Times |
| 5 | ABSENT | S | 7 | Four Times |
| 6 | ABSENCE | S | 7 | Four Times |
| 7 | ABSORB | S | 7 | Four Times |
| 8 | ABILITY | I | 4 | Three Times |
| 9 | ABOVE | O | 6 | Three Times |
| 10 | ABOUND | O | 6 | Three Times |
| 11 | ABOARD | O | 6 | Three Times |
| 12 | ABIDE | I | 4 | Three Times |
| 13 | ABROAD | R | 7 | Three Times |
| 14 | ABUNDANT | U | 8 | Twice |
| 15 | ABANDON | A | 2 | Once |

FIG.11

MOBILE TERMINAL, CHARACTER CONVERSION APPARATUS, CHARACTER CONVERSION PROCESS, COMPUTER PROGRAM, AND COMPUTER USABLE MEDIUM

CROSS-REFERENCE TO RELATED APPLICATIONS

This application is based upon and claims the benefits of priority from the prior Japanese Patent Application No. 2009-188078, filed on Aug. 14, 2009, the entire contents of which are incorporated herein by reference.

FIELD

The present invention relates to a mobile terminal and a character conversion apparatus which have a character conversion function of converting inputted characters, a character conversion process for converting inputted characters, a computer program for executing a process for converting inputted characters, and a computer usable medium recording the program.

BACKGROUND

In the mobile terminals such as mobile phones, the operation buttons mounted on, for example, a mobile phone are used for registering address information, writing address information in an address book, or inputting sentences of e-mail. Since the number of buttons which can be used as character input keys in a mobile phone is limited, a plurality of characters are assigned to each character input key. Each of the characters assigned to a character input key can be identified by the total number of times the character input key is pressed down. That is, when a character input key is pressed down once or a plurality of times, a character corresponding to the total number of times the character input key is pressed down is inputted. For example, the character "A" can be inputted by pressing down the character input key "2" once, the character "B" can be inputted by pressing down the character input key "2" twice, and the character "C" can be inputted by pressing down the character input key "2" three times.

In addition, the mobile phones make a predictive search of a dictionary database for conversion candidates each containing one or more already inputted characters, and display a result of the search on a screen. Since one of the displayed conversion candidates can be selected by using a select key, efficient operability is achieved. At this time, the mobile phones preferentially display on the screen a word or a series of words which has been previously inputted and confirmed. Specifically, the mobile phones display the words or series of words registered in the dictionary database in order of frequency of previous use, where the dictionary database is installed in the mobile phones. Thus, the total number of times the character input keys are pressed down is reduced, so that the user of each mobile phone can input characters by less operation.

In the above circumstances, a mobile phone in which the operability in character input can be improved is known (Japanese Laid-open Patent Publication No. 2007-293924).

In the above mobile phone, when a character input key in the above mobile phone is pressed down, a dictionary search unit in the mobile phone produces base character strings by combining all characters which can be inputted by the character input key and a string of unconfirmed characters which are already inputted, and searches, by reference to a dictionary, for one or more character strings each of which includes the same pronunciation as one of the base character strings. Thereafter, the mobile phone obtains one or more predicted character strings on the basis of the corresponding character string as an index, and a predicted-candidate display control unit displays the one or more predicted character strings on a screen of an output device. Then, the mobile phone overwrites the inputted character string with one of the predicted character strings which is selected by a user, and completes the display of the predicted character strings. Thus, in the above mobile phone, it is possible to reduce the number of operations of pressing down keys before obtaining desired characters, and improve the operability.

However, in the above mobile phone, a case is assumed that words or series of words registered in a dictionary database are displayed on the screen in order of frequency of use, and a word or a series of words which is displayed at a relatively low ordinal position is selected among the words or series of words displayed on the screen. In the case, the total number of operations of pressing down one or more keys is reduced and the operation is more efficient when a word or a series of words is selected by use of a character input key, than when a word or a series of words is selected by use of a select key. That is, the efficiency of the key operation (i.e., which is more efficient, to press down a character input key in preference to a select key or to press down a select key in preference to a character input key) differs according to the word or series of words to be inputted.

SUMMARY

According to a first aspect of the invention, a mobile terminal or a character conversion apparatus is provided. The mobile terminal or the character conversion apparatus has a character input key, one or more select keys, and a character conversion function for conversion of inputted characters. The mobile terminal or the character conversion apparatus includes:

(A) a storage which records and holds a table and a conversion database, where the table contains characters and total numbers of times the character input key is to be pressed down before inputting the characters, the total numbers of times being assigned to the characters respectively, and the conversion database contains strings of one or more characters and converted data items which are converted from the strings of one or more characters and correspond to the strings of one or more characters respectively;

(B) a data search unit which searches the conversion database for a plurality of conversion candidates by predicting converted data items on the basis of one or more already inputted characters;

(C) a display-order setting unit which obtains an unconverted character included in each of the plurality of conversion candidates and immediately following the one or more already inputted characters, obtains, in reference to the table, the total number of times the character input key is to be pressed down before inputting the unconverted character, and determines an order of display, on a screen of a display device, of the plurality of conversion candidates to align with a descending order of the total number of times the character input key is to be pressed down before inputting the unconverted character;

(D) a display control unit which makes the display device display, on the screen, the plurality of conversion candidates in the order of display; and (E) a character conversion unit which confirms, as a converted data item, one of the plurality of conversion candidates which is selected by use of the one or more select keys, where a position of selection on the screen can be shifted among the plurality of conversion candidates according to the order of display when one of the one or more select keys is pressed down.

According to a second aspect of the invention, a character conversion process is provided for conversion of inputted characters by use of an information processing apparatus which has an input unit including a character input key and one or more select keys, a data processing unit, and a display device. In the information processing apparatus, a table and a conversion database are recorded and held. The table contains characters and total numbers of times the character input key is to be pressed down before inputting the characters. The total numbers of times are assigned to the characters respectively. The conversion database contains strings of one or more characters and converted data items which are converted from the strings of one or more characters and correspond to the strings of one or more characters respectively.

In the process, (F) first, the data processing unit makes a predictive search of the conversion database for a plurality of conversion candidates on the basis of one or more characters inputted by use of the character input key;

(G) next, the data processing unit, obtains an unconverted character included in each of the plurality of conversion candidates and immediately following the one or more characters, obtaining, in reference to the table, the total number of times the character input key is to be pressed before inputting the unconverted character, and determining an order of display, on a screen of a display device, of the plurality of conversion candidates to align with a descending order of the total number of times the character input key is to be pressed down before inputting the unconverted character;

(H) thereafter, the display device displays the plurality of conversion candidates in the order of display on the screen; and (I) finally, the data processing unit receives confirmation of one of the plurality of conversion candidates which is selected by use of the one or more select keys as a converted data item, where a position of selection on the screen can be shifted among the plurality of conversion candidates according to the order of display when one of the one or more select keys is pressed down.

The character conversion process described above may be performed in a computer by executing computer program which is recorded in a computer-usable medium.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWINGS

Referring now to the attached drawings which form a part of this original disclosure:

FIG. 3 is a diagram illustrating an example of a table stored in a flash memory in the mobile phone illustrated in FIGS. 2A and 2B;

FIG. 4 is a diagram illustrating an example of an order of display of conversion candidates on a screen, where the order is set by the display-order setting unit in the mobile phone illustrated in FIG. 2B;

FIG. 5 is a diagram illustrating an example of an order of display of conversion candidates on the screen, where the order is set in a conventional mobile phone;

FIG. 11 is a diagram illustrating another example of an order of display of conversion candidates on the screen, where the order is set by the display-order setting unit in the mobile phone according to the embodiment of the present invention;

DESCRIPTION OF EMBODIMENTS

Hereinbelow, the mobile terminal, the character conversion apparatus, the character conversion process, the computer program for executing the character conversion process, and the computer usable medium storing the program according to the present invention are explained in detail by using an embodiment.

1. Embodiment

The mobile terminal as the embodiment of the present invention is a mobile phone. The mobile phone contains the character conversion apparatus according to the present invention in which the character conversion process according to the present invention is executed.

In a character input mode, the mobile phone makes a predictive search for candidates for a converted word or series of words containing one or more characters (e.g., one or more alphabetical characters) which are already inputted. (Hereinafter, such candidates may be referred to as conversion candidates.) Then, the mobile phone obtains, for each of the conversion candidates searched out, a character immediately following the one or more characters which are already inputted. Further, the mobile phone displays, on a screen, the conversion candidates in descending order of the total number of times a character input key is to be pressed down before inputting the obtained character.

Therefore, when the user selects one of the conversion candidates displayed in relatively high ordinal positions on the screen, the user can select the conversion candidate by a relatively reduced total number of key operations using a select key. In addition, the conversion candidates displayed on the screen are arranged in descending order of the total number of times the character input key is to be pressed down before inputting the character immediately following the one or more already inputted characters. Therefore one of the conversion candidates displayed at relatively low ordinal positions on the screen can be extracted by less operations when the character input key is used before inputting the character immediately following the one or more already inputted characters than when the select key is used before inputting the character. Hereinbelow, details of the above conversion function are explained.

2. Construction of Mobile Phone

Figure 1:
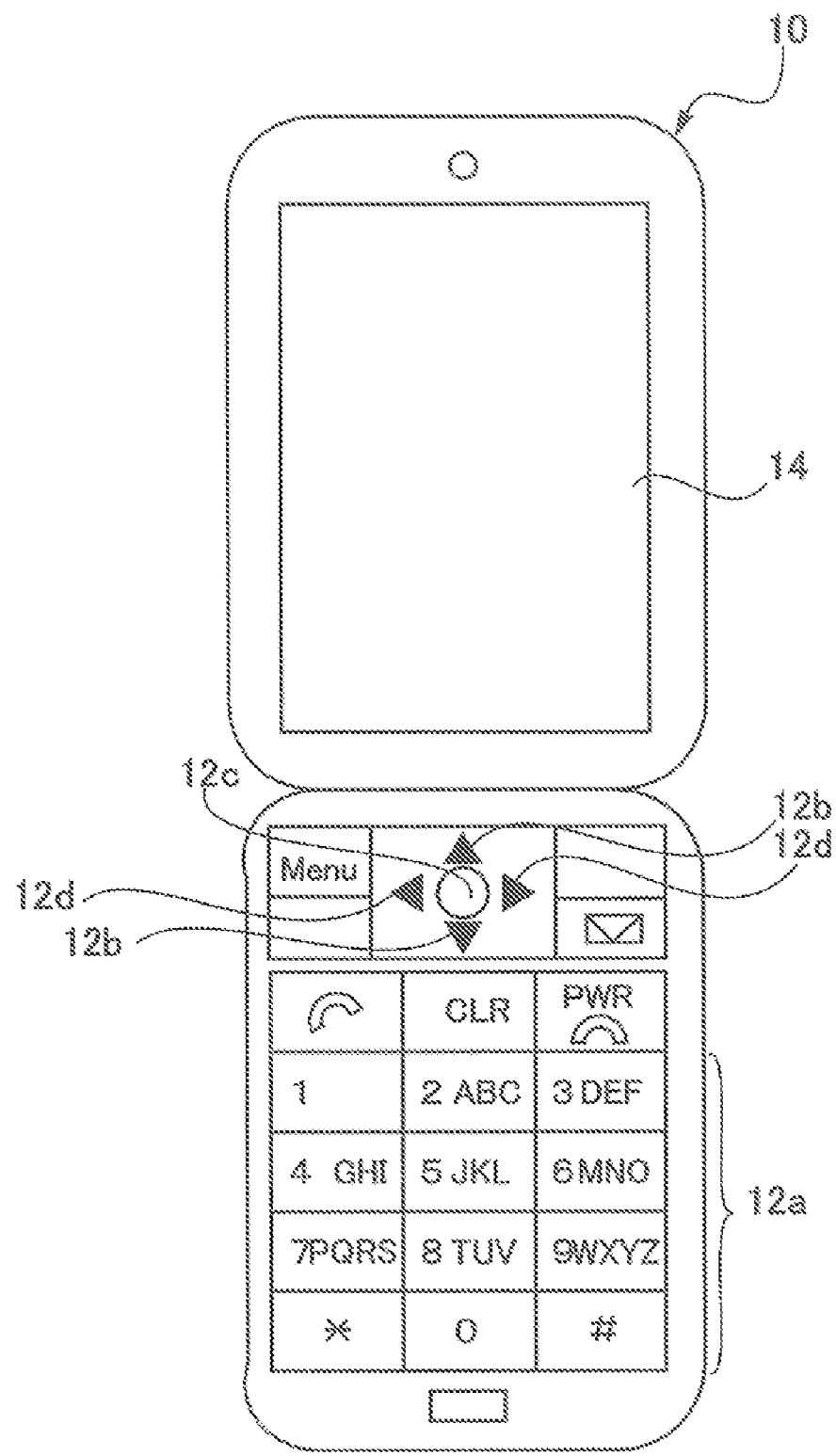
FIG. 1 is a diagram illustrating an overview of a mobile phone according to an embodiment of the present invention.
Figure 2A:
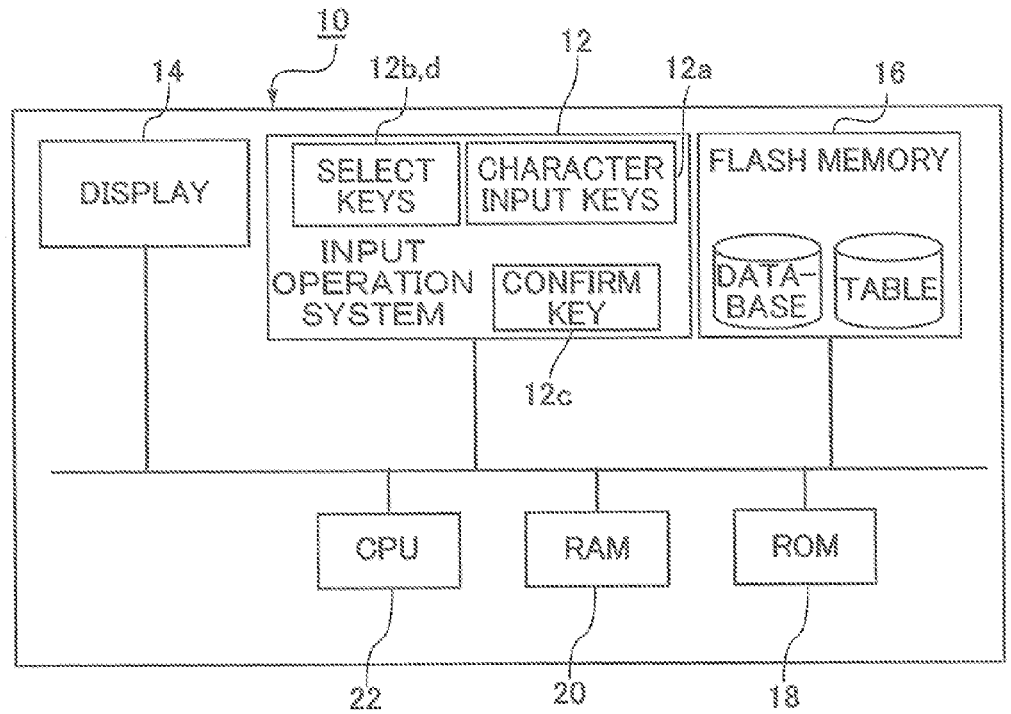
FIG. 2A is a block diagram illustrating the hardware construction for input of characters in the mobile phone according to the embodiment of the present invention.
Figure 2B:
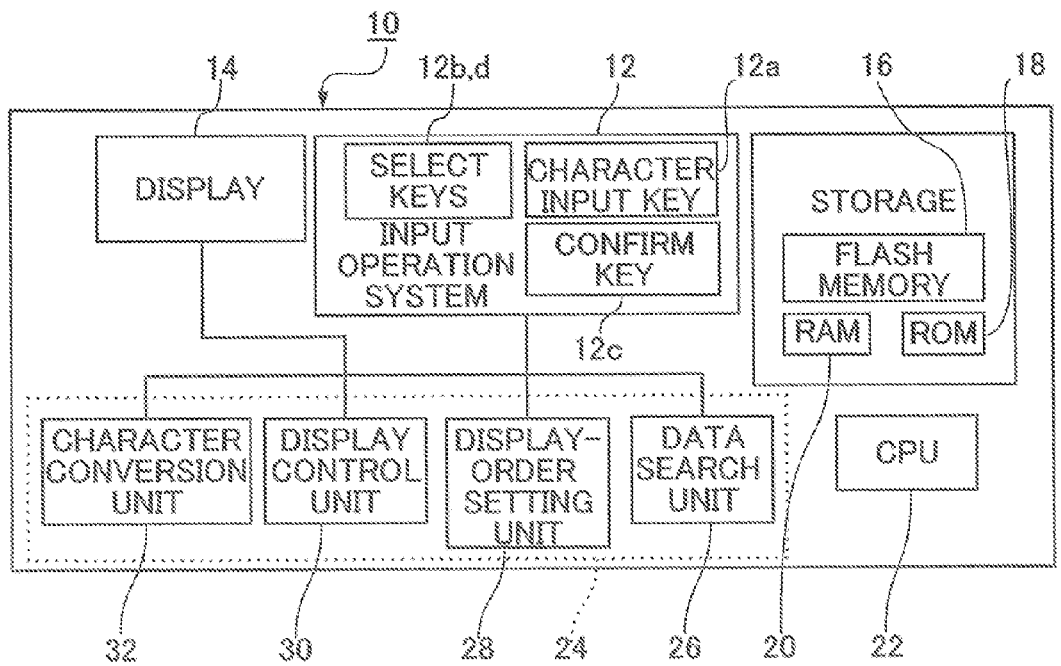
FIG. 2B is a functional block diagram illustrating the functions for input of characters in the mobile phone according to the embodiment of the present invention.

FIG. 1 illustrates an overview of a mobile phone 10 according to an embodiment of the present invention, FIG. 2A illustrates the hardware construction for input of characters in the mobile phone 10, and FIG. 2B illustrates the functional block diagram for input of characters in the mobile phone 10 illustrated in FIG. 2A.

The mobile phone 10 illustrated in FIG. 1 has the conversion function of inputting one or more alphabetical characters and converting the one or more alphabetical characters into a word or a series of words containing the one or more inputted alphabetical characters. When the mobile phone 10 is in the character input mode, the mobile phone 10 converts one or more inputted alphabetical characters into a word or a series of words containing the one or more inputted alphabetical characters.

As illustrated in FIG. 1, the mobile phone 10 has character input keys 12a, select keys 12b, a confirm key 12c, select keys 12d, and the display device 14. The character input keys 12a include the character input keys "1" to "9". A plurality of alphabetical characters are assigned to each of the character input keys "2" to "9". For example, the character "A" is inputted when the character input key "2" is pressed down once, the character "B" is inputted when the character input key "2" is pressed down twice, and the character "C" is inputted when the character input key "2" is pressed down three times. That is, when each of the character input keys 12a is pressed down a predetermined total number of times, a character assigned to the predetermined total number of times is displayed on the screen, and inputted into the mobile phone 10.

The select keys 12b include the select keys "▼" and "▲". Every time the select key "▼" is pressed down, the position of selection (i.e., the position at which a conversion candidate is selected) on the screen shift downward, so that the select key newly selects a conversion candidate for a converted word or series of words displayed immediately below another conversion candidate for the converted word or series of words which has been selected until then. When a plurality of conversion candidates for the converted word or series of words are displayed on the screen, one of the plurality of conversion candidates which is displayed at the top position is selected by pressing down the select key "▼" once, and one of the plurality of conversion candidates which is displayed immediately below the top position is selected by pressing down the select key "▼" once more. Thereafter, the position of selection on the screen shifts downward every time the select key "▼" is pressed down, so that one of the plurality of conversion candidates which is displayed at the n-th position from the top is selected by pressing down the select key "▼" n times. On the other hand, the position of selection on the screen shifts upward every time the select key "▲" is pressed down, so that the select key newly selects one of the plurality of conversion candidates displayed immediately above another of the plurality of conversion candidate which has been selected until then. That is, the select keys 12b are provided for selecting one of the plurality of conversion candidates searched out by shifting the position of selection on the screen one by one from the top position.

The confirm key 12c is used for confirming a selected one of the plurality of conversion candidates. That is, when the confirm key 12c is pressed down, one of the plurality of conversion candidates selected by use of the select keys 12b is confirmed, and inputted into a sentence which is currently being made.

The select keys 12d are used, in the case where the plurality of conversion candidates are displayed on the screen in a tabular form, for shifting the position of selection on the screen to a lateral adjacent field in the tabular form in order to select one of the plurality of conversion candidates.

As illustrated in FIGS. 2A and 2B, the mobile phone 10 contains an input operation system 12, a display device 14, a flash memory 16, a ROM (Read Only Memory) 18, a RAM (random access memory) 20, and a CPU (central processing unit) 22. In addition, although not illustrated, the mobile phone 10 further contains a transmit/receiver unit for performing wireless communication.

The input operation system 12 is provided for the user to input characters into the mobile phone 10 by pressing down keys in the character input mode. The aforementioned character input keys 12a, select keys 12b, confirm key 12c, and select keys 12d are included in the input operation system 12.

The display device 14 displays a character input screen or a mail transmission screen on the display 14 for inputting characters in the character input mode.

The flash memory 16 is a storage in which a table and a conversion database (dictionary database) are recorded and held. The table contains characters and total numbers of times the character input key is to be pressed down before inputting the characters. The total numbers of times are respectively assigned to the characters. The conversion database contains one or more strings of one or more alphabetical characters and a words or series of words which are converted from the one or more strings and respectively correspond to the one or more strings of one or more alphabetical characters. Further, information on the frequency of use of each of the words and/or series of words is also recorded and held in the conversion database in correspondence with each of the word or series of words.

The ROM 18 is a rewritable ROM, and stores a character input program. The program is explained in detail later. The RAM 20 temporarily stores other information such as results of calculation and processing performed by the CPU 22.

The CPU 22 runs the character input program stored in the ROM 18, and executes processing for inputting characters in accordance with a process flow of the character input program. When the character input program is started, a program module 24 is functionally formed in the mobile phone 10 as illustrated in FIG. 2B. Since the ROM 18 is rewritable, the character input program may be read from a computer-readable recording medium in which the character input program is recorded, and written in the ROM 18.

The program module 24 includes a data search unit 26, a display-order setting unit 28, a display control unit 30, and a character conversion unit 32. The data search unit 26, the display-order setting unit 28, the display control unit 30, and the character conversion unit 32 in the program module 24 respectively have the data processing functions as explained below, and the data processing functions are realized by execution of the character input program by the CPU 22. The program module 24 can be considered to be an example of the aforementioned data processing unit.

The data search unit 26 makes a predictive search of the conversion database in the flash memory 16 for words or series of words on the basis of one or more characters (e.g., one or more alphabetical characters) which are already inputted. Thus, a word or series of words are extracted by the data search unit 26 as conversion candidates for a converted word or series of words. In addition, when one of the conversion candidates is confirmed, the data search unit 26 updates the frequency of use of the confirmed conversion candidate which is recorded in the conversion database.

When a plurality of conversion candidates for a converted word or series of words are searched out, the display-order setting unit 28 finds an unconverted character corresponding to each of the plurality of conversion candidates and immediately following the one or more already inputted characters. In addition, the display-order setting unit 28 obtains, for each of the conversion candidates, the total number of times the character input key 12a is to be pressed down before inputting the above unconverted character, in reference to the table. Further, the display-order setting unit 28 sorts the conversion candidates by using the obtained total number of times so that the total number of times one of the select keys 12b is to be pressed down before selecting one of the conversion candidates decreases with increase in the total number of times the character input key is to be pressed down before inputting the corresponding unconverted character, and determines the order of display of the sorted conversion candidates on the screen. Specifically, the display-order setting unit 28 determines the order of display of the conversion candidates to align with the descending order of the obtained total number of times the character input key is to be pressed down before inputting the corresponding unconverted character. Further, when each of the searched out conversion candidates includes a unconverted character which immediately follows the one or more already inputted characters and total number of times the character input key is to be pressed down before inputting the unconverted character is identical to each other in the searched out conversion candidates, the display-order setting unit 28 determines the order of display of the searched out conversion candidates on the screen to align with the descending order of the frequency of use.

The display control unit 30 makes the display device 14 display the conversion candidates so that the conversion candidates are arranged on the screen in the order determined by the display-order setting unit 28.

The character conversion unit 32 confirms a selected one of the displayed conversion candidates and inputs the selected one of the displayed conversion candidates into the sentence which is currently being made, when the confirm key 12c is pressed down.

The table stored in the flash memory 16 indicates the correspondence between the total numbers of times each character input key is to be pressed down and alphabetical characters assigned to the numbers of times. FIG. 3 illustrates an example of the table. For example, when the alphabetical character "S" is intended to be inputted, the corresponding character input key 12a is pressed down four times. FIG. 4 illustrates an example of the order of the conversion candidates displayed on the screen. In the example of FIG. 4, conversion candidates ("ABSTRACT", "ABSOLUTE", ... ) which are obtained by the search when the alphabetical characters "AB" are previously inputted are indicated, and the order of display of the conversion candidates on the screen is determined to align with the descending order of the total number of times the character input key 12a is to be pressed down before inputting the alphabetical character immediately following the alphabetical characters "AB" in each conversion candidate. Further, when the total number of times the character input key is to be pressed down before inputting the unconverted characters corresponding to each of ones of the conversion candidates is identical each other, the ones of the conversion candidates are displayed on the screen in descending order of the frequency of use.

FIG. 5 illustrates a conventional example of an order of display of conversion candidates on the screen. The example illustrated in FIG. 5 is an order of display of conversion candidates on the screen which is set when the alphabetical characters "AB" are inputted. Conventionally, conversion candidates which are previously confirmed are preferentially displayed on the screen, and the order of display of conversion candidates on the screen is determined to align with the descending order of the frequency of use, which is registered in a conversion database. Therefore, in the example of FIG. 5, the words "ABOUT" and "ABLE", which are previously confirmed, are most preferentially displayed on the screen, and the words "ABUNDANT", "ABANDON", and "ABSTRACT", which are not previously confirmed but are registered as frequently used candidates, are set as conversion candidates which are to be displayed on the screen in preference to other conversion candidates. As illustrated in FIG. 5, in this case, conventionally, a character immediately following the alphabetical characters "AB" in each conversion candidate containing the alphabetical characters "AB" is not obtained, and the order of display of the conversion candidates is not determined to align with the descending order of the total number of times a character input key is to be pressed down before inputting the obtained character. For example, the total number of times a character input key is to be pressed down before inputting the alphabetical character "O" which immediately follows the alphabetical character "B" in the word "ABOUT", which is displayed at the top on the screen, is three. On the other hand, the total number of times a character input key is to be pressed down before inputting the alphabetical character "S" which immediately follows the alphabetical character "B" in the word "ABSTRACT", which is displayed at fifth position from the top on the screen, is four. As explained above, the order of display, on the screen, of the plurality of conversion candidates illustrated in FIG. 4 is different from the conventional order of display, on the screen, of the plurality of conversion candidates illustrated in FIG. 5.

As explained before, in the mobile phone 10, the order of display, on the screen, of the plurality of conversion candidates for a word or a series of words, which are obtained by the predictive search, is determined so that the total number of times one of the select keys 12b is to be pressed down decreases with increase in the number of times a character input key is to be pressed down before inputting a character immediately following one or more already inputted characters. Therefore, in the case where an appropriate one of the conversion candidates is displayed at a relatively high ordinal position on the screen, the appropriate one of the conversion candidates can be selected by a reduced total number of operations of pressing down the select key. On the other hand, in the case where an appropriate one of the conversion candidates is displayed at a relatively low ordinal position on the screen, the appropriate one of the conversion candidates can be selected by pressing down a reduced total number of operations of pressing down a character input key 12a without using the select keys 12b, since the use of a character input key enables key operations reduced for inputting the character immediately following one or more already inputted characters in each of the conversion candidates displayed at a relatively low ordinal position on the screen. Thus, application of the functions related to character conversion and provided in the mobile phone 10 according to the present embodiment is not limited to mobile phone, and the disclosed functions related to character conversion can also be effectively applied to character conversion apparatuses (such as mobile terminals) in which the number of input keys is limited and characters are assigned to the numbers of times a key is to be pressed down.

In the present embodiment, alphabetical characters are applied as characters but alphabetical characters are not limited. Any characters may be applied to the embodiment. For example, conversion from inputted Japanese hiragana or katakana characters to a word or a series of words including Chinese characters and Japanese hiragana or katakana characters.

3. Character Conversion Process

Hereinbelow, the character conversion process executed in the mobile phone 10 is explained in detail.

Figure 6:
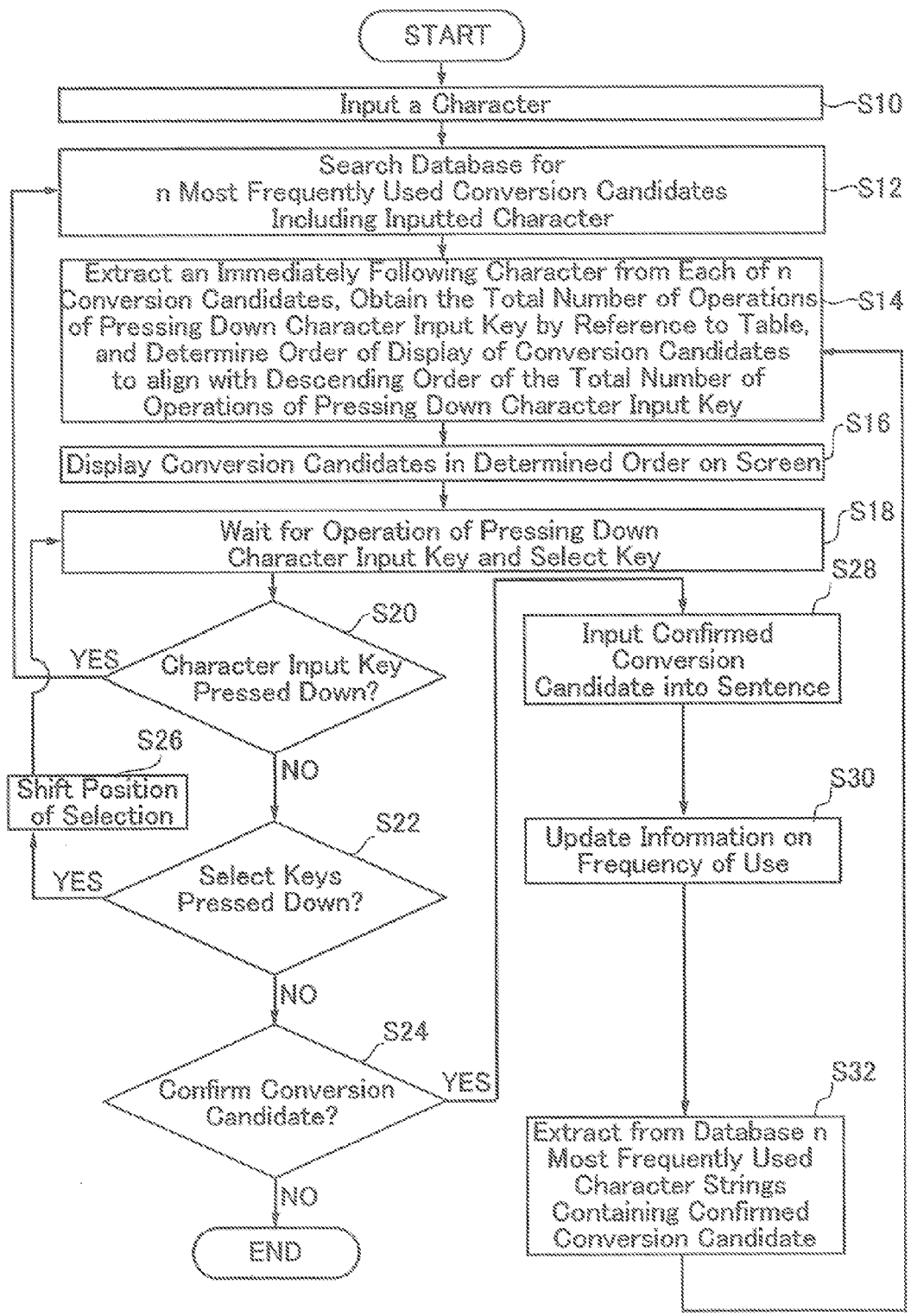
FIG. 6 is a flow diagram indicating a sequence of a character conversion process executed in the mobile phone illustrated in FIG. 1.

FIG. 6 indicates a sequence of the character conversion process which is executed in the mobile phone 10 illustrated in FIG. 1. FIGS. 7A, 7B, 7C, and 7D illustrate examples of screens displayed in respective processing steps in the display device 14 in the mobile phone 10 illustrated in FIG. 1, and FIGS. 8A, 8B, and 8C illustrate other examples of screens displayed in respective processing steps in the display device 14 in the mobile phone 10 illustrated in FIG. 1.

Figure 7A:
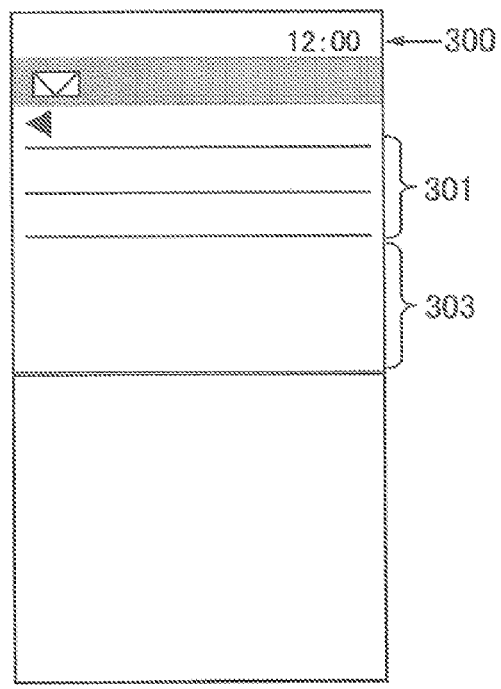
FIGS. 7A, 7B, 7C, and 7D are diagrams illustrating examples of screens displayed in respective processing steps in the display device in the mobile phone illustrated in FIG. 1.
Figure 7B:
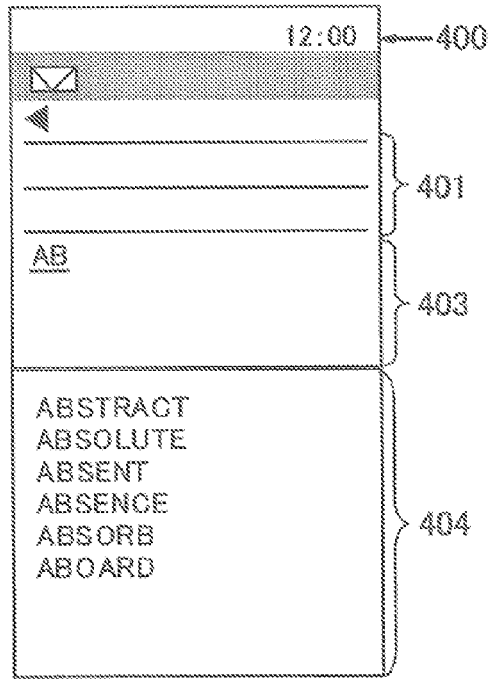
Figure 7C:
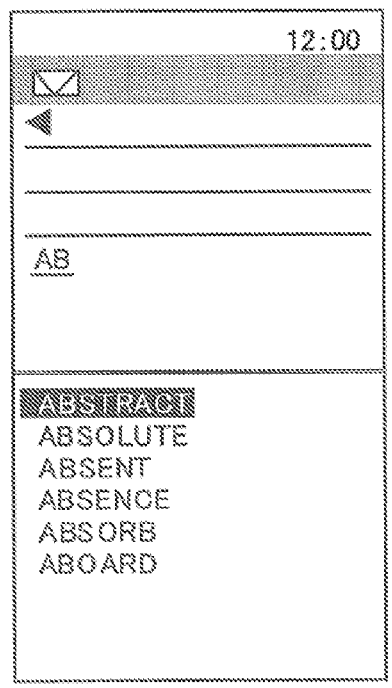
Figure 7D:
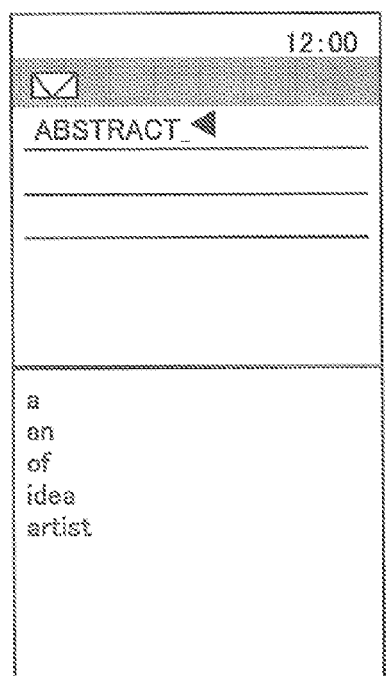

When the mobile phone 10 enters a mail production mode, the screen is switched to a mail production screen 300 as illustrated in FIG. 7A. The mail production screen 300 includes a confirmed-character display area 301 and a candidate selection area 303. FIGS. 7B, 7C, and 7D illustrate examples of screens displayed in respective processing steps after the mobile phone 10 enters the character input mode and the screen of the mobile phone 10 is switched to a character input screen 400. The character input screen 400 includes a confirmed-character display area 401, an unconfirmed-input display area 403, and a candidate display area 404, which are displayed for inputting a confirmed word or a confirmed series of words in order to make a sentence.

While the character input screen 400 is displayed, a character (e.g., the alphabetical character "A") is inputted by the character input keys 12a (in step S10). Then, the data search unit 26 searches the conversion database stored in the flash memory 16 for the n most frequently used conversion candidates for a word or a series of words which begin with the inputted character (in step S12), and stores the n conversion candidates in the RAM 20.

Subsequently, the display-order setting unit 28 reads out the n conversion candidates from the RAM 20, extracts a character immediately following the already inputted character in each of the n conversion candidates, and obtains the total number of times a character input key 12a is to be pressed down before inputting the extracted character. The table (as illustrated in FIG. 3) stored in the flash memory 16 is used for obtaining the total number of times the character input key 12a is to be pressed down before inputting the extracted character. In addition, the display-order setting unit 28 determines the order of display, on the screen, of the conversion candidates to align with the descending order of the total number of times a character input key is to be pressed down before inputting the character extracted from each conversion candidate (in step S14). The information on the obtained order of display is stored in the RAM 20. Thereafter, the display control unit 30 displays the conversion candidates (which are searched out in step S12) on the screen of the display 14 in the order which is read out from the RAM 20. In this state, the character conversion unit 32 waits for an operation of pressing down one of the character input keys 12a, the select keys 12b, and the confirm key 12c (step S18).

Then, the character conversion unit 32 determines whether a character is inputted by pressing down one of the character input keys 12a (in step S20), whether a conversion candidate is selected by pressing down one of the select keys 12b (in step S22), and whether a conversion candidate is confirmed by pressing down the confirm key 12c (in step S24). When it is determined that a character is inputted by pressing down one of the character input keys 12a, the operation goes back to step S12, and conversion candidates for a word or a series of words which contain the character previously inputted in step S10 and the character inputted in step S20 are searched for. Thereafter, the mobile phone 10 executes the steps S14, S16, and S18, and then enters the wait state in step S18.

When the mobile phone 10 enters the wait state in step S18 after the characters "A" and "B" are respectively inputted in steps S10 and S20 and the steps S14 and S16 are executed, the screen of FIG. 7B is displayed. In the candidate display area 404 in the screen of FIG. 7B, the conversion candidates are displayed in the order determined by the display-order setting unit 28. In the example of FIG. 7B, the conversion candidates are displayed in the order indicated in FIG. 4.

When one of the select keys 12b is pressed down in the wait state in step S18, the position of selection (i.e. the position at which a conversion candidate is selected) on the screen shifts (in step S26), i.e., the selected conversion candidate is changed. When the "▼" key in the select keys 12b (illustrated in FIG. 1) is pressed down, a conversion candidate displayed immediately below the conversion candidate which has been selected until then is newly selected. When the "▲" key in the select keys 12b (illustrated in FIG. 1) is pressed down, a conversion candidate displayed immediately above the conversion candidate which has been selected until then is newly selected. In the example displayed in FIG. 7C, the position of selection is at the word "ABSTRACT", i.e., the word "ABSTRACT" is selected.

When the selected conversion candidate is confirmed by pressing down the confirm key 12c in the wait state in step S18, the character conversion unit 32 inputs the confirmed conversion candidate into the sentence which is currently being made and displayed in the confirmed-character display area 401 (in step S28). Then, the data search unit 26 updates the information on the frequency of use of the confirmed conversion candidate which is recorded in the conversion database (in step S30). After the conversion candidate is confirmed, the data search unit 26 searches the conversion database for the n most frequently used conversion candidates for a longer word or a longer series of words containing the confirmed word or the confirmed series of words (in step S32). Thereafter, the steps S14, S16, and S18 are executed again. That is, after a conversion candidate is confirmed, the confirmed conversion candidate is newly regarded as one or more inputted characters, and the steps S14, S16, and S18 are executed again. FIG. 7D illustrates a screen displayed in the wait state in step S18, where longer words or a series of words containing the confirmed word "ABSTRACT" are searched for and displayed. Specifically, the words (including "a" and "an") which can immediately follow the word "ABSTRACT" are indicated in FIG. 7D.

Thereafter, input of a character and conversion into a word or a series of words are repeatedly performed until operations of pressing down the character input keys 12a, the select keys 12b, or the confirm key 12c are completed.

Figure 8A:
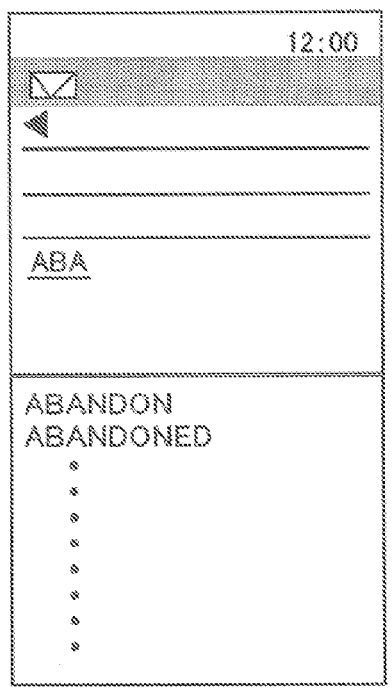
FIGS. 8A, 8B, and 8C are diagrams illustrating other examples of screens displayed in respective processing steps in the display device in the mobile phone illustrated in FIG. 1.
Figure 8B:
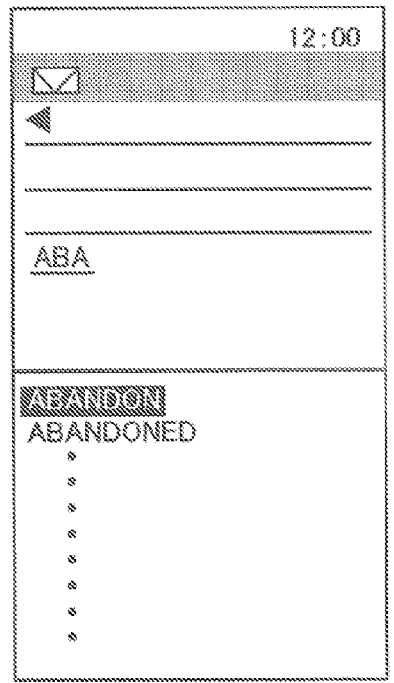
Figure 8C:
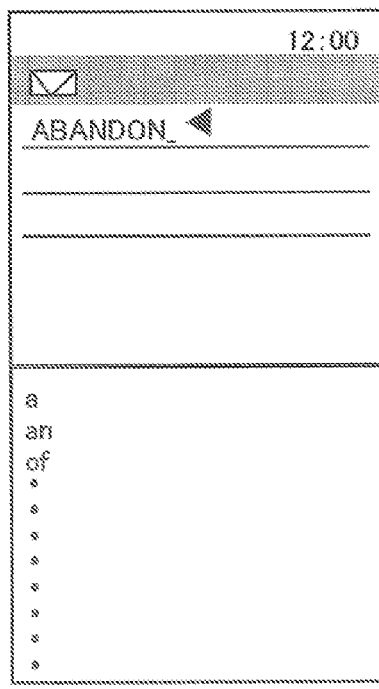

FIGS. 7A to 7D illustrate the screens displayed during the operations in an example in which character conversion can be performed by less key operations when the select keys 12b are used than when the character input keys 12a are used. However, FIGS. 8A to 8C illustrate screens displayed during operations in an example in which character conversion can be performed by less key operations when the character input keys 12a are used than when the select keys 12b are used.

For example, in the case where conversion to the word "ABANDON" is intended by a user, and the characters "AB" are inputted as illustrated in FIG. 7B, the ordinal position of the word "ABANDON" is low, and the word "ABANDON" is not displayed on the screens illustrated in FIGS. 7B and 7C. Since the ordinal position of the word "ABANDON" is 15th in the example of FIG. 4, the word "ABANDON" is not displayed on the first page of the screen, and is displayed on one of the following pages. In this example, when one of the select keys 12b is pressed down 15 times, the position of selection (i.e., the position at which a conversion candidate is selected) shifts to the low ordinal position of the word "ABANDON", i.e., the word "ABANDON" is selected. On the other hand, when the character "A" is inputted subsequently to the input of the characters "AB" as illustrated in FIG. 8A, the ordinal position of the word "ABANDON" in the order of display on the screen becomes high. Therefore, as illustrated in FIGS. 8A and 8B, it is possible to select and confirm the word "ABANDON" by pressing down one of the character input keys 12a once for inputting the character "A", and pressing down one of the select keys 12b once for selecting the word "ABANDON" as the conversion candidate.

As explained above, in the case where the ordinal position of a conversion candidate displayed on the screen is low, the displayed conversion candidates are narrowed down by inputting a character by one of the character input keys 12a, which enables to get the ordinal position of the conversion candidate higher, so that the total number of key operations can be reduced. In many cases where a conversion candidate desired by a user is not displayed at a high ordinal position in the candidate display area 404 on the screen, the user inputs a character by using one of the character input keys 12a rather than seeks to select the conversion candidate by repeatedly pressing down the select keys 12b so as to shift downward the position of selection to the low ordinal position of the desired conversion candidate. Therefore, in the case where the ordinal position of a conversion candidate displayed on the screen is low, the user can select the desired conversion candidate by less key operations when the user inputs a character by the character input keys 12a.

Figure 9:
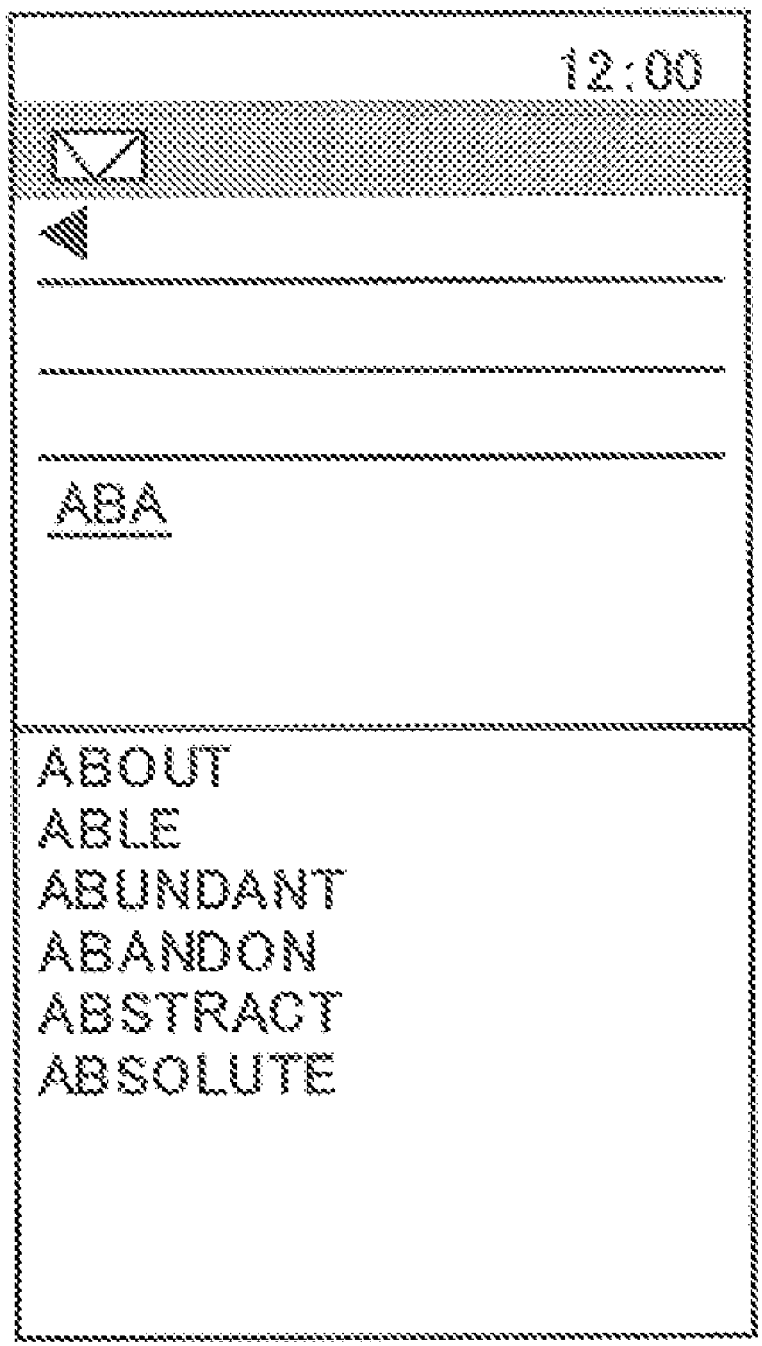
FIG. 9 is a diagram illustrating an example of a screen displayed in a conventional character conversion process.

FIG. 9 illustrates an example of a screen displayed in a conventional character conversion process. In the screen illustrated in FIG. 9, the conversion candidates which are previously confirmed are preferentially displayed, and the order of display of the conversion candidates on the screen is determined on the basis of the frequency of use of the conversion candidates, which is recorded in a conversion database. Therefore, in the case where the conversion candidates are displayed on the screen in the conventional manner, the select key is pressed down four times until the conversion candidate "ABANDON" is selected.

In the character conversion process which is executed in the mobile phone 10 according to the present embodiment, a character immediately following one or more already inputted characters in each conversion candidate is obtained, and the order of display of the conversion candidates on the screen is determined to align with the descending order of the total number of times one of the character input keys 12a is to be pressed down before inputting the obtained character. Therefore, character conversion can be efficiently performed by less key operations using the select keys 12b.

According to the present embodiment, the total number of times one of the character input keys 12a is to be pressed down is relatively small before inputting a character immediately following one or more already inputted characters in each conversion candidate displayed at a relatively low ordinal position. Although the total number of times one of the select keys 12b is to be pressed down is a lot before a conversion candidates displayed at a relatively low ordinal position is selected, the user can narrow down the displayed conversion candidates by inputting a character immediately following one or more already inputted characters in the conversion candidate by use of one of the character input keys 12a. In this case, the ordinal position of the conversion candidate which contains the inputted character and has been displayed at a relatively low ordinal position until then can be raised by the narrowing down of the conversion candidate. At this time, the total number of times the one of the character input keys 12a is to be pressed down is small before inputting the above character. Thus, the user can perform efficient key operations by using only one of the select keys 12b or using both of one of the character input keys 12a and one of the select keys 12b, and the efficiency in the key operations is not greatly affected by the converted word or series of words.

4. Variation I

According to the above embodiment, n conversion candidates are displayed on the screen in descending order of the total number of times one of the character input keys 12a is pressed down, where the order of display is determined by the display-order setting unit 28 in the mobile phone 10 and in step S14 in the character conversion process. On the other hand, in the variation I of the above embodiment, the processing performed by the display-order setting unit 28 (or in step S14) is modified as follows.

Figure 10:
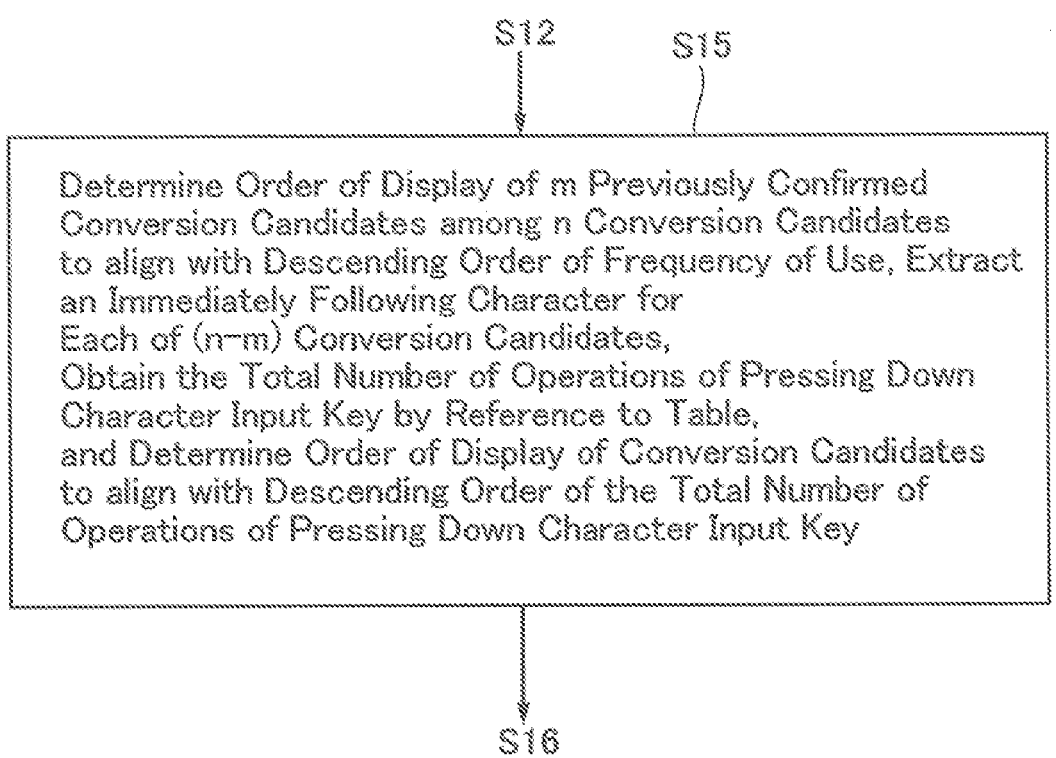
FIG. 10 is a diagram illustrating a step alternative to a part of the sequence of the character conversion process indicated in FIG. 6.

In the variation I, the order of display, on the screen, of m previously confirmed conversion candidates among n conversion candidates which are searched out by the display-order setting unit 28 (where n>m) is determined to align with the descending order of the frequency of use of the m previously confirmed conversion candidates. Then, a character immediately following one or more already inputted characters in each of the remaining (n−m) conversion candidates is obtained, and the order of display, on the screen, of the (n−m) conversion candidates is determined to align with the descending order of the total number of times one of the character input keys 12a is to be pressed down before inputting the obtained character. That is, in the process sequence in the variation I, the operations in step S14 in the sequence of FIG. 6 are replaced with the operations in step S15 illustrated in FIG. 10.

FIG. 11 is a diagram illustrating an example of the order of display of conversion candidates on the screen in the variation I, where the conversion candidates illustrated in FIG. 11 correspond to the conversion candidates illustrated in FIG. 4. In the example of FIG. 11, m=2, and the previously confirmed words "ABOUT" and "ABLE" are respectively determined to be the first and second conversion candidates in the order of display based on the frequency of use. Thereafter, the remaining words "ABSTRACT", "ABSOLUTE", • . . . are determined to be the third, fourth, and following conversion candidates in the order of display based on the descending order of the total number of times one of the character input keys 12a is to be pressed down. That is, the conversion candidates are displayed on the screen in the order indicated in FIG. 11.

In the variation I, the screen includes first and second areas which are concurrently displayed. In the first area, the previously confirmed ones of the conversion candidates searched out are arranged in order of the frequency of use. In the second area, the remaining ones of the conversion candidates searched out are arranged in descending order of the total number of times one of the character input keys 12a is to be pressed down before inputting an alphabetical character immediately following one or more already inputted characters in each conversion candidate.

As explained above, in the variation I, one or more conversion candidates which are previously confirmed and frequently used are displayed at high ordinal positions, so that the user can select a desired conversion candidate by less key operations.

5. Variation II

Figures 12, 13:
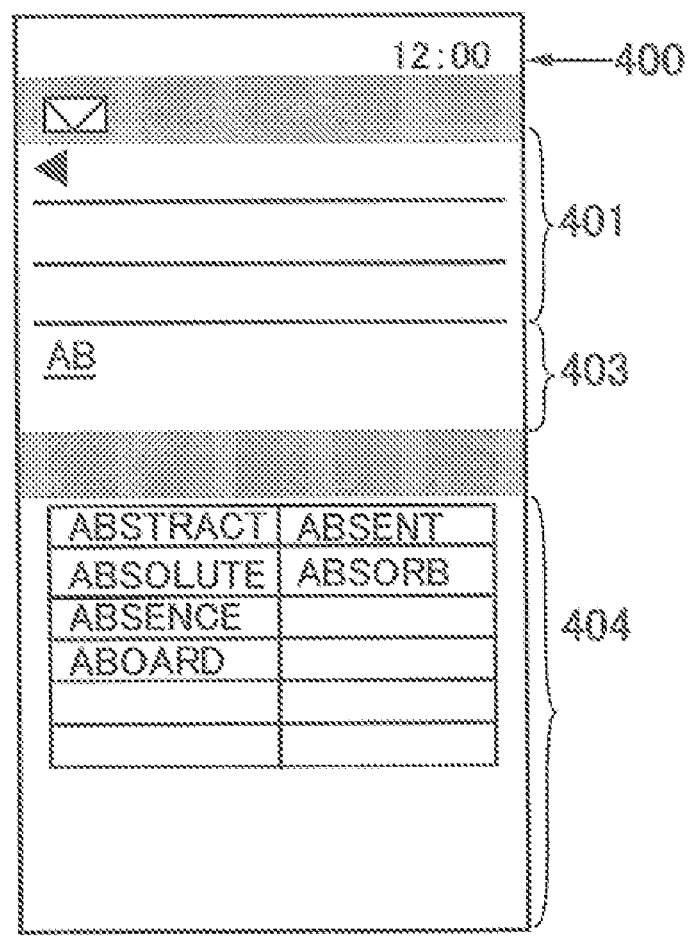
FIG. 12 is a diagram illustrating a further example of display of conversion candidates on the screen in the mobile phone according to the embodiment of the present invention.
FIG. 13 is a diagram illustrating an example of an order of display positions for conversion candidates in the tabular form indicated in FIG. 12.

In the mobile phone 10 according to the embodiment explained before, the conversion candidates are arranged along the vertical direction in the candidate display area 404 on the displayed screen as illustrated in FIG. 7B. In the variation II, the displayed conversion candidates are arranged in the form of a table having a plurality of rows and a plurality of columns as illustrated in FIG. 12. In this case, the select keys 12d illustrated in FIG. 1 are used as well as the select keys 12b. The select keys 12b are used as row selection keys for shifting the position of selection in the vertical direction, and the select keys 12d are used as column selection keys for shifting the position of selection in the horizontal direction. In the variation II, the character conversion unit 32 in the mobile phone 10 confirms one of the conversion candidates in the table when the row and column are determined by the select keys 12b and 12d.

Further, the display-order setting unit 28 obtains, for each of the conversion candidates searched out, a character immediately following one or more characters which are already inputted. Then, the display-order setting unit 28 determines the order of display of the conversion candidates to align with the descending order of the total number of times one of the character input keys 12a is to be pressed down before inputting the obtained character. In order to display the conversion candidates on the screen, the display control unit 30 assigns a display position (field in the table on the screen) to each of the conversion candidates in the determined order of display, where the order of assignment of the display positions (fields) are determined to align with the ascending order of the sum of the total number of times one of the select keys 12b is to be pressed down and the total number of times one of the select keys 12d is to be pressed down before selecting the display position. At this time, in the case where the sum of the total number of times one of the select keys 12b is to be pressed down and the total number of times one of the select keys 12d is to be pressed down before selecting each of the display positions is identical to each other, the order of such display positions (fields) is determined to align with the ascending order of the total number of times a predetermined one of the select keys 12b and 12d is to be pressed down before selecting each of display positions (fields).

FIG. 13 is a diagram illustrating an example of an order of display positions, on the screen, for conversion candidates in a tabular form 50, which has six rows and two columns. In FIG. 13, an example of an order of display positions (fields), which is determined by the display control unit 30, is indicated by the ordinal numbers of the display positions in the table 50. In the example of FIG. 13, in the case where the sum of the total number of times one of the select keys 12b is to be pressed down and the total number of times one of the select keys 12d is to be pressed down before selecting the each of two display positions is identical to each other, the order of the display positions (fields) is determined to align with the ascending order of the total number of times one of the select keys 12d is to be pressed down before selecting each display position (field). For example, the sum of the total number of times one of the select keys 12b is to be pressed down and the total number of times one of the select keys 12d is to be pressed down is two before selecting each of the display positions (fields) A and B in FIG. 13. Since the total number of times one of the select keys 12d is to be pressed down before selecting the display position (field) A is smaller than the total number of times one of the select keys 12d is to be pressed down for selecting the display position (field) B, the ordinal number of the display position (field) A is 2, and the ordinal number of the display position (field) A is 3. Alternatively, in the case where the sum of the total number of times one of the select keys 12b is to be pressed down before selecting each of display positions (fields) and the total number of times one of the select keys 12d is to be pressed down before selecting the each of display positions is identical to each other, the order of the display positions (fields) may be determined to align with the ascending order of the total number of times one of the select keys 12b (instead of the one of the select keys 12d) is to be pressed down before selecting each of display positions (fields). In the Variation II, each of the select keys 12b and the select keys 12d allows the position of selection to shift in a predetermined direction according to the order of display when each of the select keys 12b and the select keys 12d is pressed sown.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal comprising a character input key, one or more select keys, and a character conversion function for conversion of inputted characters, comprising:

a storage which records and holds a table and a conversion database, where the table contains characters and total numbers of times the character input key is to be pressed down before inputting the characters, the total numbers of times being assigned to the characters respectively, and the conversion database contains strings of one or more characters and converted data items which are converted from the strings of one or more characters and correspond to the strings of one or more characters respectively;

a data search unit which searches the conversion database for a plurality of conversion candidates by predicting converted data items on the basis of one or more already inputted characters;

a display-order setting unit which obtains an unconverted character included in each of the plurality of conversion candidates and immediately following the one or more already inputted characters, obtains, in reference to the table, the total number of times the character input key is to be pressed down before inputting the unconverted character, and determines an order of display, on a screen of a display device, of the plurality of conversion candidates to align with a descending order of the total number of times the character input key is to be pressed down before inputting the unconverted character;

a display control unit which makes the display device display, on the screen, the plurality of conversion candidates in the order of display; and a character conversion unit which confirms, as a converted data item, one of the plurality of conversion candidates which is selected by use of the one or more select keys, where a position of selection on the screen can be shifted among the plurality of conversion candidates according to the order of display when one of the one or more select keys is pressed down.

2. The mobile terminal according to claim 1, wherein the plurality of conversion candidates searched out by the data search unit are displayed on the screen in the display device in a tabular form having rows and columns, the one or more select keys include a first key for determining a row and a second key for determining a column, the character conversion unit selects one of the plurality of conversion candidates in the tabular form by determining a row and a column by use of the first key and the second key, and the display control unit assigns a display position for each of the plurality of conversion candidates in the determined order of display, and makes the display device display each of the plurality of conversion candidates in the assigned display position, where the display position is assigned in ascending order of a sum of the total number of times the first select key is to be pressed down and the total number of times the second select key is to be pressed down before selecting the display position.

3. The mobile terminal according to claim 2, wherein in a case where sum of the total number of times the first select key is to be pressed down and the total number of times the second select key is to be pressed down before selecting each of two display positions is identical to each other, the display control unit determines an order of the display positions to be in align with an ascending order of the total numbers of times a predetermined one of the first select key and the second select key is to be pressed down for selecting the respective display positions.

4. The mobile terminal according to claim 1, wherein the conversion database stores frequency-of-use information indicating frequency of previous use of converted data items, the character conversion unit updates the frequency-of-use information according to confirmation of one of the plurality of conversion candidates as the converted data item, and in a case where each of conversion candidates searched out by the data search unit includes a character which immediately follows the one or more already inputted characters and total number of times the character input key is to be pressed down before inputting the character is identical to each other in the searched out conversion candidates, the display-order setting unit determines the order of display of the searched out conversion candidates so that the total number of times one of the one or more select keys is to be pressed down before selecting each of the searched out conversion candidates decreases with increase in frequency of previous use of the searched out conversion candidates.

5. The mobile terminal according to claim 4, wherein the display control unit makes the display device concurrently display a first image and a second image, where a part of the plurality of conversion candidates are displayed in the first image in order of frequency of use on the basis of the frequency-of-use information, and a rest of the plurality of conversion candidates are displayed in the second image in the order of display of the plurality of conversion candidates determined by the display-order setting unit.

6. A character conversion apparatus comprising a character input key, one or more select keys, and a character conversion function for conversion of inputted characters, comprising:

a storage which records and holds a table and a conversion database, where the table contains characters and total numbers of times the character input key is to be pressed down before inputting the characters, the total numbers of times being assigned to the characters respectively, and the conversion database contains strings of one or more characters and converted data items which are converted from the strings of one or more characters and correspond to the strings of one or more characters respectively;

a data search unit which searches the conversion database for a plurality of conversion candidates by predicting converted data items on the basis of one or more already inputted characters;

a display-order setting unit which obtains an unconverted character included in each of the plurality of conversion candidates and immediately following the one or more already inputted characters, obtains, in reference to the table, the total number of times the character input key is to be pressed down before inputting the unconverted character, and determines an order of display, on a screen of a display device, of the plurality of conversion candidates to align with a descending order of the total number of times the character input key is to be pressed down before inputting the unconverted character;

a display control unit which makes the display device display, on the screen, the plurality of conversion candidates in the order of display; and a character conversion unit which confirms, as a converted data item, one of the plurality of conversion candidates which is selected by use of the one or more select keys, where a position of selection on the screen can be shifted among the plurality of conversion candidates according to the order of display when one of the one or more select keys is pressed down.

7. A character conversion process for converting inputted characters by using an information processing apparatus which has an input unit including a character input key and one or more select keys, a data processing unit, and a display device, comprising:

recording and holding a table and a conversion database in the information processing apparatus, where the table contains characters and total numbers of times the character input key is to be pressed down before inputting the characters, the total numbers of times being assigned to the characters respectively, and the conversion database contains strings of one or more characters and converted data items which are converted from the strings of one or more characters and correspond to the strings of one or more characters respectively;

making, by the data processing unit, a predictive search of the conversion database for a plurality of conversion candidates on the basis of one or more characters inputted by use of the character input key;

obtaining, by the data processing unit, an unconverted character included in each of the plurality of conversion candidates and immediately following the one or more characters, obtaining, in reference to the table, the total number of times the character input key is to be pressed before inputting the unconverted character, and determining an order of display, on a screen of a display device, of the plurality of conversion candidates to align with a descending order of the total number of times the character input key is to be pressed down before inputting the unconverted character;

displaying, by the display device, the plurality of conversion candidates in the order of display on the screen; and receiving, by the data processing unit, confirmation of one of the plurality of conversion candidates which is selected by use of the one or more select keys as a converted data item, where a position of selection on the screen can be shifted among the plurality of conversion candidates according to the order of display when one of the one or more select keys is pressed down.

8. The character conversion process according to claim 7, wherein the plurality of conversion candidates are displayed on the screen in a tabular form having rows and columns, the one or more select keys include a first key for determining a row and a second key for determining a column, one of the plurality of conversion candidates is selected, when the confirmation is received, in the tabular form by determining a row and a column by use of the first key and the second key, and a display position is assigned, when the plurality of conversion candidates are displayed, for each of the plurality of conversion candidates in the determined order of display for displaying each of the plurality of conversion candidates in the assigned display position, where the display position is assigned in ascending order of a sum of the total number of times the first select key is to be pressed down and the total number of times the second select key is to be pressed down before selecting the display position.

9. The character conversion process according to claim 8, wherein in the case where in a case where sum of the total number of times the first select key is to be pressed down and the total number of times the second select key is to be pressed down before selecting each of two display positions is identical to each other, an order of the display positions is determined to be in align with an ascending order of the total numbers of times a predetermined one of the first select key and the second select key is to be pressed down before selecting the respective display positions.

10. The character conversion process according to claim 7, wherein the conversion database stores frequency-of-use information indicating frequency of previous use of converted data items, the frequency-of-use information is updated according to confirmation of one of the plurality of conversion candidates as the converted data item, and in a case where conversion candidates searched out includes a character which immediately follows the one or more already inputted characters and total number of times the character input key is to be pressed down before inputting the character is identical to each other in the searched out conversion candidates, an order of display of the searched out conversion candidates is determined so that the total number of times one of the one or more select keys is to be pressed down before selecting each of the searched out conversion candidates decreases with increase in frequency of previous use of the searched out conversion candidates.

11. The character conversion process according to claim 10, wherein a first image and a second image are concurrently displayed by the display device, a part of the plurality of conversion candidates being displayed in the first image in order of frequency of use on the basis of the frequency-of-use information, and a rest of the plurality of conversion candidates being displayed in the second image in the determined order of display of the plurality of conversion candidates.

12. The character conversion process according to claim 7, wherein after the confirmation of the one of the plurality of conversion candidates is received, the one of the plurality of conversion candidates is newly regarded as the one or more characters, and then making the predictive search, obtaining the unconverted character, obtaining the total number of times, determining the order of display, displaying the plurality of conversion candidates, and receiving the confirmation are repeated.

13. A computer-usable medium recording a computer program embodied therein, which makes a computer execute a process for converting inputted characters, where the computer has a data processing unit, a storage, a display device and an input unit which includes a character input key and one or more select keys, the process comprising:

recording and holding a table and a conversion database in the storage, where the table contains characters and total numbers of times the character input key is to be pressed down before inputting the characters, the total numbers of times being assigned to the characters respectively, and the conversion database contains strings of one or more characters and converted data items which are converted from the strings of one or more characters and correspond to the strings of one or more characters respectively;

making, by the data processing unit, a predictive search of the conversion database for a plurality of conversion candidates on the basis of one or more characters inputted by use of the character input key;

obtaining, by the data processing unit, an unconverted character included in each of the plurality of conversion candidates and immediately following the one or more characters, obtaining, in reference to the table, the total number of times the character input key is to be pressed before inputting the unconverted character, and determining an order of display, on a screen of a display device, of the plurality of conversion candidates to align with a descending order of the total number of times the character input key is to be pressed down before inputting the unconverted character;

displaying, by the display device, the plurality of conversion candidates in the order of display on the screen; and receiving, by the data processing unit, confirmation of one of the plurality of conversion candidates which is selected by use of the one or more select keys as a converted data item, where a position of selection on the screen can be shifted among the plurality of conversion candidates according to the order of display when one of the one or more select keys is pressed down.

14. A computer program embodied in a computer-usable medium, which makes a computer execute a process for converting inputted characters, the computer comprising a data processing unit, a storage, a display device and an input unit which includes a character input key and one or more select keys, the program comprising:

causing the storage to record and hold a table and a conversion database, where the table contains characters and total numbers of times the character input key is to be pressed down before inputting the characters, the total numbers of times being assigned to the characters respectively, and the conversion database contains strings of one or more characters and converted data items which are converted from the strings of one or more characters and correspond to the strings of one or more characters respectively;

causing the data processing unit to make a predictive search of the conversion database for a plurality of conversion candidates on the basis of one or more characters inputted by use of the character input key;

causing the data processing unit to obtain an unconverted character included in each of the plurality of conversion candidates and immediately following the one or more characters, to obtain, in reference to the table, the total number of times the character input key is to be pressed before inputting the unconverted character, and to determine an order of display, on a screen of a display device, of the plurality of conversion candidates to align with a descending order of the total number of times the character input key is to be pressed down before inputting the unconverted character;

causing the display device to display the plurality of conversion candidates in the order of display on the screen; and causing the data processing unit to receive confirmation of one of the plurality of conversion candidates which is selected by use of the one or more select keys as a converted data item, where a position of selection on the screen can be shifted among the plurality of conversion candidates according to the order of display when one of the one or more select keys is pressed down.

* * * * *